(12) United States Patent
Kaiser et al.

(10) Patent No.: US 9,441,989 B2
(45) Date of Patent: Sep. 13, 2016

(54) POSITION ENCODER AND ASSOCIATED PEDAL UNIT

(75) Inventors: Harry Kaiser, Markgroeningen (DE); Eduard Maiterth, Heilbronn (DE)

(73) Assignee: Robert Bosch GmbH, Stuttgart (DE)

( * ) Notice: Subject to any disclaimer, the term of this patent is extended or adjusted under 35 U.S.C. 154(b) by 216 days.

(21) Appl. No.: 14/005,792

(22) PCT Filed: Jan. 30, 2012

(86) PCT No.: PCT/EP2012/051401
§ 371 (c)(1),
(2), (4) Date: Nov. 27, 2013

(87) PCT Pub. No.: WO2012/126653
PCT Pub. Date: Sep. 27, 2012

(65) Prior Publication Data
US 2014/0084908 A1 Mar. 27, 2014

(30) Foreign Application Priority Data
Mar. 24, 2011 (DE) .......................... 10 2011 006 035

(51) Int. Cl.
*G01B 7/30* (2006.01)
*G01D 5/12* (2006.01)
*G01D 5/14* (2006.01)
*G01D 11/24* (2006.01)

(52) U.S. Cl.
CPC *G01D 5/12* (2013.01); *G01D 5/14* (2013.01); *G01D 11/245* (2013.01)

(58) Field of Classification Search
CPC ...... G01D 5/145; G01D 5/14; G01D 11/245; G01B 7/0003

USPC .................................................... 324/207.25
See application file for complete search history.

(56) References Cited

U.S. PATENT DOCUMENTS

| 5,241,936 A * | 9/1993 | Byler et al. .................. 123/399 |
| 5,768,946 A * | 6/1998 | Fromer et al. .................. 74/514 |
| 6,426,619 B1 * | 7/2002 | Pfaffenberger et al. ... 324/207.2 |
| 2008/0106873 A1 | 5/2008 | Okuya |

FOREIGN PATENT DOCUMENTS

| CN | 101476579 A | 7/2009 |
| CN | 101865700 A | 10/2010 |
| DE | 30 39 893 A1 | 5/1981 |
| DE | 197 31 555 A1 | 4/1998 |

(Continued)

OTHER PUBLICATIONS

International Search Report corresponding to PCT Application No. PCT/EP2012/051401, mailed Jul. 5, 2012 (German and English language document) (5 pages).

*Primary Examiner* — Reena Aurora
(74) *Attorney, Agent, or Firm* — Maginot, Moore & Beck LLP (57) ABSTRACT

A position encoder includes a sensor unit and an encoder unit configured to follow a motion of a lever by means of a pusher so as to enable the sensor unit to capture said motion. The encoder unit and the sensor unit include separate housings connected to each other. The connection between the housings of the encoder unit and the sensor unit is implemented by means of a hollow riveted connection with at least one fastening element configured to be guided into the hollow space thereof.

19 Claims, 8 Drawing Sheets

(56) References Cited

FOREIGN PATENT DOCUMENTS

| DE | 10 2007 000 649 A1 | 5/2008 |
|---|---|---|
| DE | 10 2008 062 337 A1 | 7/2009 |
| EP | 0 063 645 A2 | 11/1982 |
| JP | 57-173731 A | 10/1982 |
| JP | 2001-317909 A | 11/2001 |
| JP | 2008-7006 A | 1/2008 |
| JP | 2008-124062 A | 5/2008 |

\* cited by examiner

POSITION ENCODER AND ASSOCIATED PEDAL UNIT

This application is a 35 U.S.C. §371 National Stage Application of PCT/EP2012/051401, filed on Jan. 30, 2012, which claims the benefit of priority to Serial No. DE 10 2011 006 035.9, filed on Mar. 24, 2011 in Germany, the disclosures of which are incorporated herein by reference in their entirety.

BACKGROUND

The disclosure is based on a position encoder and on a pedal unit.

Usually, when a position encoder is manufactured, separate assemblies, in particular a sensor unit and a position encoder unit, are combined and prefabricated to form one common physical unit. In this state, at least one electrical characteristic curve is programmed in, said curve requiring predefined distances between the position encoder unit and the sensor unit. This requires nondetachable pre-assembly of the two assemblies, which can be implemented, for example, by means of bonding and/or soldering and/or welding and/or latching and/or screwing etc. The completely assembled position encoder is then mounted on a bearing block of a lever to be sensed. The sensor unit and the position encoder unit are usually embodied with steel sockets which are encapsulated by injection molding and which take up the prestressing force of attachment elements which connect the sensor unit and the position encoder unit to one another and/or connect the completely assembled position encoder to the bearing block of the pedal unit or lever unit. The position encoder, which is connected, to the lever via a driver, for example measures travel or a rotational angle of the lever to be sensed, which lever can be embodied as a pedal crank, for example, in particular as a pedal or as a crank handle etc.

Laid-open patent application DE 10 2007 000 649 A1 describes an assembly structure for a position encoder with a sensor unit and a position encoder unit. The position encoder unit follows a motion of a lever by means of a driver, with the result that the sensor unit sense this motion, wherein the position encoder unit and the sensor unit have separate housings which are connected to one another. In this context, the two housings of the position encoder unit and the sensor unit are welded to one another by laser welding and attached to a pedal unit by means of attachment screws via assembly struts.

SUMMARY

The position encoder according to the disclosure, has, by contrast, the advantage that the connection between the housing of the position encoder unit and the housing of the sensor unit is implemented by means of at least one hollow riveted connection, in the cavity of which at least one attachment element can be guided. Embodiments of the present disclosure therefore make available an inseparable connection between the position encoder unit and the sensor unit and at the same time a means for guiding a corresponding attachment element, said means being necessary for mounting the position encoder on the bearing block of the lever unit. With this type of connection between the two assemblies, the assembly of the complete position encoder is advantageously facilitated since the means for guiding the attachment element is already present. Furthermore, embodiments of the present disclosure permit a space-saving connection of the two assemblies since all the necessary attachment measures and/or connection measures are carried out at one region. The use of a hollow rivet for connecting the two assemblies and for guiding the attachment element is also more economical in terms of material since there is no need for any steel sockets, encapsulated by injection molding, for the respective attachment element. Furthermore, the at least one attachment element cannot damage the housings of the two assemblies as a result of excessive tightening since the hollow rivet takes up the prestressing force. In addition, heat-sensitive components can also be used in the assemblies since no welded connections and/or soldered connections are used for assembling the two assemblies.

Embodiments of the present disclosure make available a position encoder which comprises a sensor unit and a position encoder unit. The position encoder unit follows a motion of a lever by means of a driver, which motion can be sensed by the sensor unit. The position encoder unit and the sensor unit have separate housings which are connected to one another. According to the disclosure, the connection between the housings of the position encoder unit and the sensor unit is implemented by means of at least one hollow riveted connection, in the cavity of which at least one attachment element can be guided.

A position encoder unit is understood here to be a physical unit which comprises a signal encoder for generating a physical variable. The generated physical variable changes indirectly or directly as a result of the motion of the lever via the driver. A possible signal encoder is, for example, a permanent magnet. The associated changeable physical variable is a magnetic field, wherein magnetic field lines of the magnetic field change their direction advantageously by virtue of the motion of the lever. Sources of electromagnetic waves and/or sound waves can be used as further possible signal encoders. An amplitude and/or wavelength and/or wave frequency, which are changed by the motion of the lever, can then be used as the physical variable. The signal encoder can be surrounded by a seal in order to protect it against external influences.

A sensor unit is understood here to be a physical unit which comprises at least one sensor which is fixed in relation to the signal encoder and which senses the motion of the lever on the basis of the change in the physical variable generated by the signal encoder. In particular, the angular dependence of the physical variable can be sensed. Depending on the physical property of the signal encoder, the sensor unit comprises, for example, a Hall sensor and/or a magneto-resistive sensor and/or an inductive sensor and/or an optical sensor and/or an ultrasonic sensor and/or a high frequency sensor and/or a radar sensor or some other suitable sensor. Furthermore, the sensor unit comprises an evaluation unit which converts the change in the physical variable into an electrical signal, preferably an actuation signal. An interface, which is embodied as a plug-in connection, for example, outputs the generated actuation signal to a control unit for further processing.

Advantageous improvements of the position encoder specified in the disclosure and of the pedal unit specified in the disclosure are possible by virtue of the measures and developments disclosed in the dependent claims.

It is particularly advantageous that the connection between the housings of the position encoder unit and the sensor unit of the position encoder according to the disclosure is embodied as at least one tubular rivet. Tubular rivets can advantageously be acquired inexpensively as a mass product in various suitable embodiments and in large quantities.

In one advantageous embodiment of the position encoder according to the disclosure, the housing of the position encoder unit and/or the housing of the sensor unit has a spray protection means at the connection region of the two assemblies. The signal encoder of the position encoder unit is arranged in the connection region between the two assemblies. A seal is arranged between the housing of the position encoder unit and the sensor housing in order to protect the signal encoder against external influences, in particular against moisture. In addition, the spray protection means in the connection region between the two assemblies prevents a water jet, which originates from a cleaning device, for example, in particular from a high pressure cleaner, from striking the seal directly and damaging it or making it inoperative. Furthermore, the spray protection means advantageously prevents coarse soiling from entering the interior of the position encoder unit and/or between position encoder unit and the sensor unit and thereby inhibiting the mobility of the signal encoder and/or blocking up the position encoder unit and/or falsifying the position encoder signal.

In a further advantageous embodiment of the position encoder according to the disclosure, the spray protection means is embodied as a raised portion and/or oblique portion and/or edge and/or collar. This permits an effective spray protection means which is matched to the external conditions and which increases the functional life of the position encoder by virtue of the fact that internal components are not prematurely worn and/or damaged by contamination and/or moisture.

In a further advantageous embodiment of the position encoder according to the disclosure, the housing of the position encoder unit also accommodates the driver. This prevents moisture and/or soiling from entering the interior of the position encoder via the driver. Furthermore, the housing of the position encoder unit protects the driver against external influences such as, for example, against coldness and/or heat and/or moisture and/or external forces which do not originate from the lever motion to be sensed, to which housing the driver is coupled. This ensures that only the motions of the lever which are to be sensed are transmitted via the driver, but no undesired external shocks and/or vibrations. Furthermore, the housing of the position encoder unit protects the driver against damage.

In a further advantageous embodiment of the position encoder according to the disclosure, the driver is connected to a shaft and drives this shaft, wherein the shaft is mounted in a hollow axle of the position encoder unit and comprises the signal encoder which is operatively connected to the shaft, wherein the signal encoder generates a physical variable which changes with the motion of the shaft. The sensor unit senses the changeable physical variable and evaluates it. The driver is therefore coupled on one side to the lever and on the other side to the shaft. As a result of a motion of the lever, the shaft is rotated, for example, via the driver. The signal encoder is attached to the shaft by, for example, soldering and/or bonding and/or screwing. In this way, the signal encoder moves with the shaft. The signal encoder and the sensor of the sensor unit are separated from one another by means of an air gap. This permits smooth transmission of the signal. Furthermore, the sensor can be accommodated completely in the housing of the sensor unit if the housing is made of a material which is permeable to the physical variable from the signal encoder. If the signal encoder is embodied as a permanent magnet, for example, the magnetic field lines can penetrate the housing, and the sensor can sense, by way of example, the changes in the magnetic field which are brought about by the rotational motion of the signal encoder. As a result, the sensor can be protected by the housing against external influences. Since there are a multiplicity of possible signal encoders which convert a motion into a changeable physical variable, a multiplicity of possibilities for sensing a change in travel and/or angle are obtained, and these can be matched to the corresponding motion which is to be sensed.

In a further advantageous embodiment of the position encoder according to the disclosure, a spring element, which is embodied as a compression spring, is mounted about the hollow axle of the position encoder unit, wherein the spring element regulates the distance between the driver and the shaft and/or the distance between the signal encoder and the sensor unit. As a result, the driver which is mounted on the shaft is advantageously always pressed to one side. As a result, rattling noises are prevented from being generated despite a necessary axial play for the shaft in the hollow axle, with the result that the position encoder according to the disclosure can be operated with a particularly low level of noise. Furthermore, the distance between the signal encoder and the sensor is always kept to the same value, and therefore the measuring accuracy is increased.

In a further advantageous embodiment of the position encoder according to the disclosure, the spring element is mounted in such a way that the prestressing force of the spring element moves the driver into a predefined home position. In this context, the spring element is advantageously mounted on the housing of the position encoder unit and on the driver by hooking in, latching, bonding etc. The restoring force of the spring element moves the driver back into its home position. In this way, a constant basic setting is obtained for an unactivated state in which the lever which is to be sensed is also located in its home position. The reliable returning of the driver to its home position does not bring about any change in the characteristic curve which is ascertained. Furthermore, the restoring force of the spring element results in a tolerance offset which compensates for elastic activation deformations in the lever which is to be sensed, and does not transmit such undesired deformations to the position encoder unit.

Embodiments of the position encoder according to the disclosure can be used in a pedal unit with a pedal lever and a bearing block, for example, for determining the pedal travel of the pedal lever. In this context, the position encoder is attached to the bearing block of the pedal lever, and coupled to the pedal lever via the driver. Since the position encoder is already completely assembled, it can quickly be connected to any pedal unit.

In one advantageous embodiment of the pedal unit according to the disclosure, the position encoder is connected to the bearing block of the pedal unit by means of at least one attachment element which is guided through the cavity of a tubular rivet. This permits extremely fast and cost-effective mounting of the position encoder on the pedal unit.

An exemplary embodiment of the disclosure is illustrated in the drawings and will be explained in more detail in the following description. In the drawings, identical reference symbols denote components or elements which carry out the same or analogous functions.

DETAILED DESCRIPTION

As is apparent from FIGS. 1 to 8, the illustrated exemplary embodiment of a position encoder 1 according to the disclosure comprises a sensor unit 20 and a position encoder unit 10. The position encoder unit 10 follows, by means of a driver 14, a motion of a lever (not illustrated) which is to be sensed, which motion is sensed by the sensor unit 20. As is also apparent from FIGS. 1 to 8, the position encoder unit 10 and the sensor unit 20 have separate housings 12, 22 which are connected to one another and are embodied as a plastic housing in the illustrated exemplary embodiment. The connection between the housings 12, 22 of the position encoder unit 10 and the sensor unit 20 is implemented by means of at least one hollow riveted connection, in particular by means of a tubular rivet 30, in the cavity of which at least one attachment element (not illustrated) can be guided.

In order to connect the sensor unit 20 to the position encoder unit 10, the sensor unit 20 is positioned correctly on the position encoder unit 10 by means of two centering pins 36 and two corresponding centering drill holes 34 in the position encoder unit 10. The housings 12, 22 of the two assemblies 10, 20 are shaped in such a way that the sensor unit 20 closes off the upper opening region of the position encoder unit 10 except for a narrow region between the underside of the sensor unit 20 and the upper side of the position encoder unit 10. The tubular rivets 30 are guided through insertion openings 32 provided in the housing of the sensor unit 20 and in the housing of the position encoder unit 10, and after the insertion are widened and riveted by means of corresponding tools. As a result, the housing 22 of the sensor unit 20 is securely connected to the housing 12 of the position encoder unit 10, and the tubular rivet 30 is captively attached to the physical unit which is produced. A seal 18.2 is arranged between the housing 12 of the position encoder unit 10 and the housing 22 of the sensor unit in order to protect the interior of the position encoder unit 10 against external influences, in particular against moisture and soiling. The seal 18.2 is pressed against the housing floor 22.1 of the sensor housing 22 by the riveted connection 30, with the result that a better seal for the position encoder unit 10 can be achieved.

Figure 1:
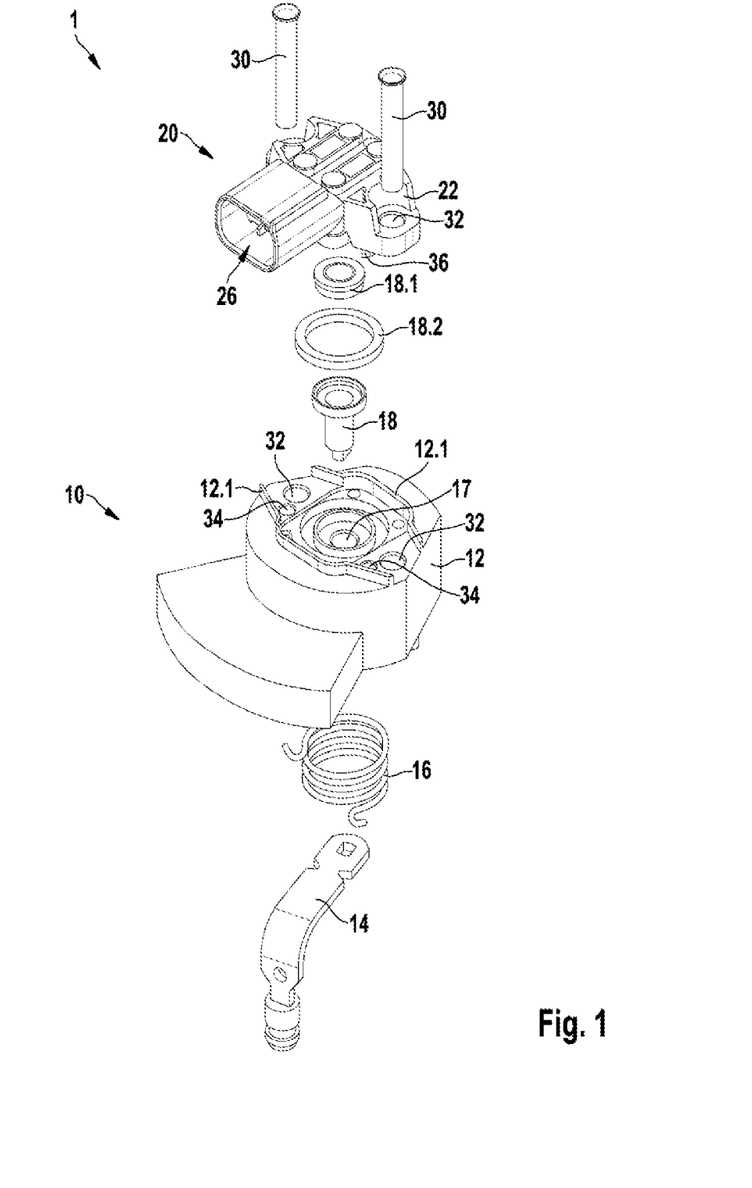
FIG. 1 shows an exploded illustration of an exemplary embodiment of a position encoder according to the disclosure from above.
Figure 2:
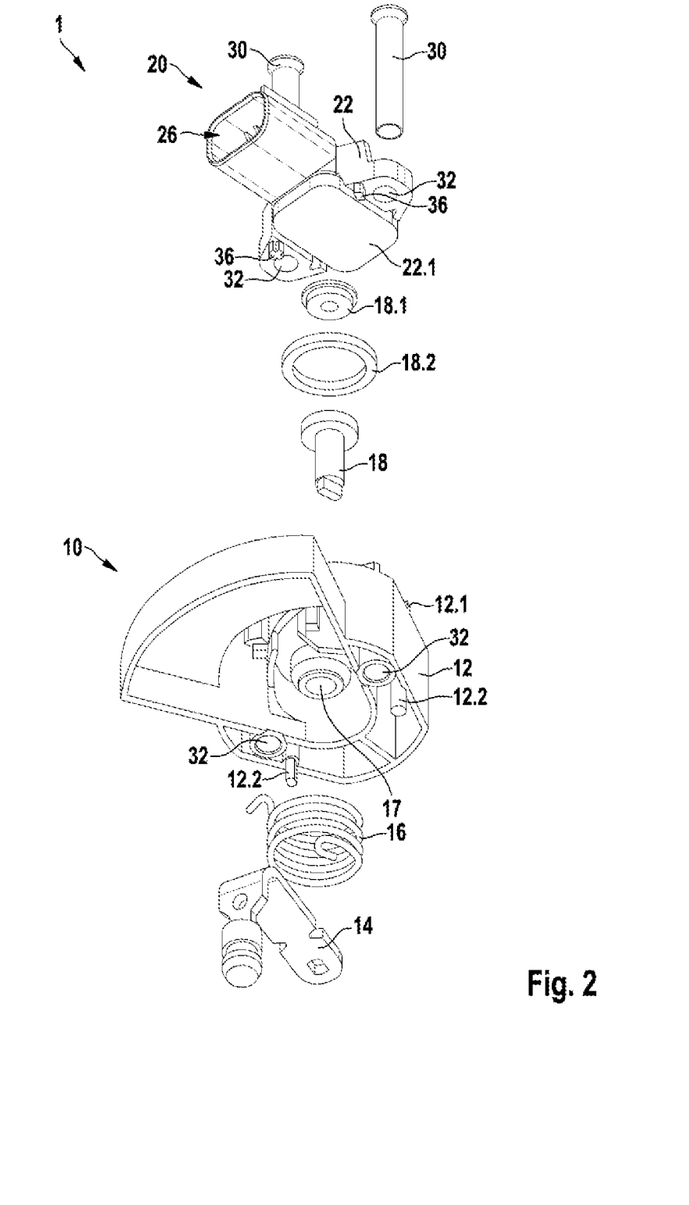
FIG. 2 shows an exploded illustration of the exemplary embodiment of a position encoder according to the disclosure from FIG. 1 from below.
Figure 3:
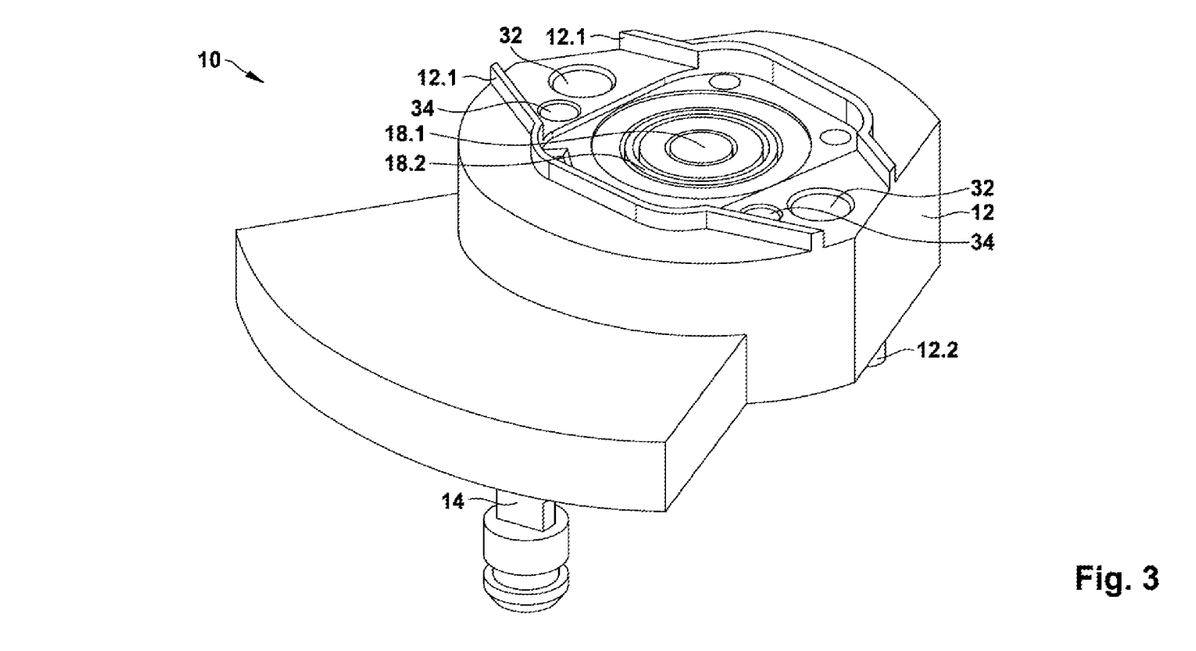
FIG. 3 shows a schematic perspective illustration of the assembled position encoder unit for the position encoder according to the disclosure from FIGS. 1 and 2.

As is apparent from FIG. 3 in particular, the housing 12 of the position encoder unit 10 in the illustrated exemplary embodiment has a spray protection means 12.1 in order to protect the connection region between the sensor unit 20 and the position encoder unit against external influences such as, for example, soiling. In addition, the spray protection means 12.1 in the connection region between the two assemblies 10, 20 prevents a water jet, originating from a cleaning device, for example, in particular from a high pressure cleaner, from striking the seal 18.2 directly and damaging it or making it inoperative. In the case of alternative embodiments (not illustrated), the spray protection means 12.1 can be arranged on the housing floor 22.1 of the sensor housing 22 or both on the sensor housing 22 and on the position encoder housing 12.

Figure 4:
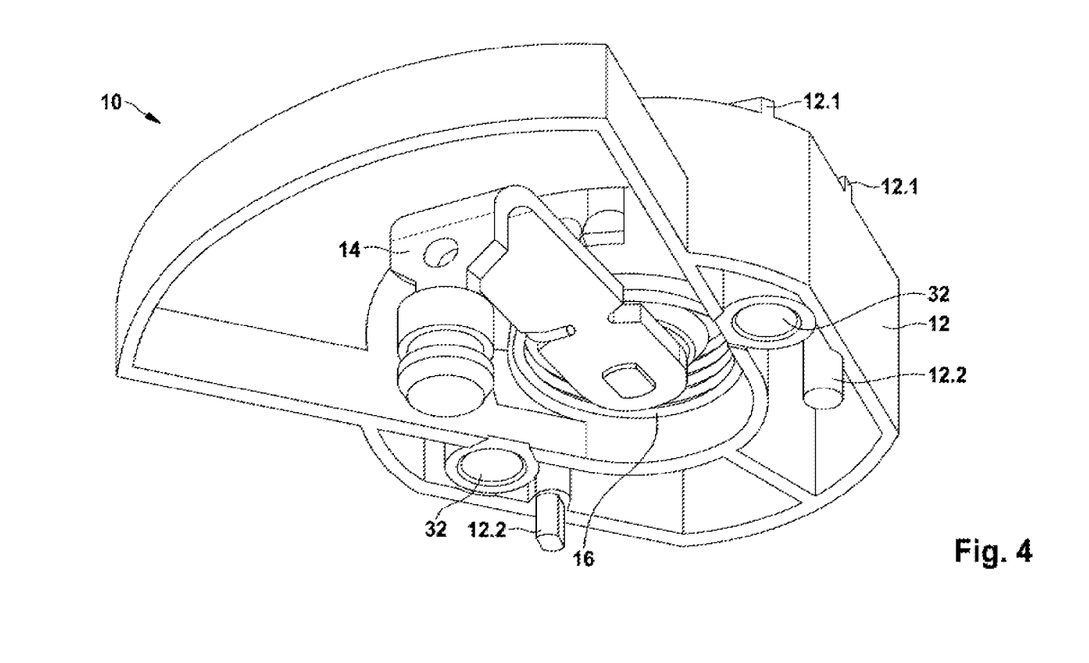
FIG. 4 shows a further schematic perspective illustration of the assembled position encoder unit for the position encoder according to the disclosure from FIGS. 1 and 2.
Figure 5:
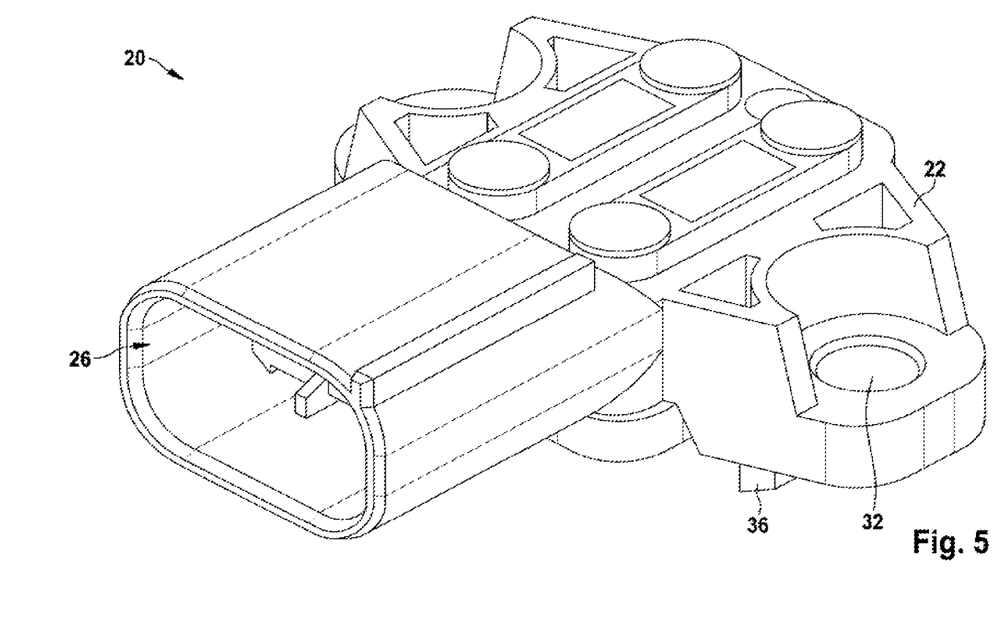
FIG. 5 shows a schematic perspective illustration of the assembled sensor unit for the position encoder according to the disclosure from FIGS. 1 and 2.
Figure 6:
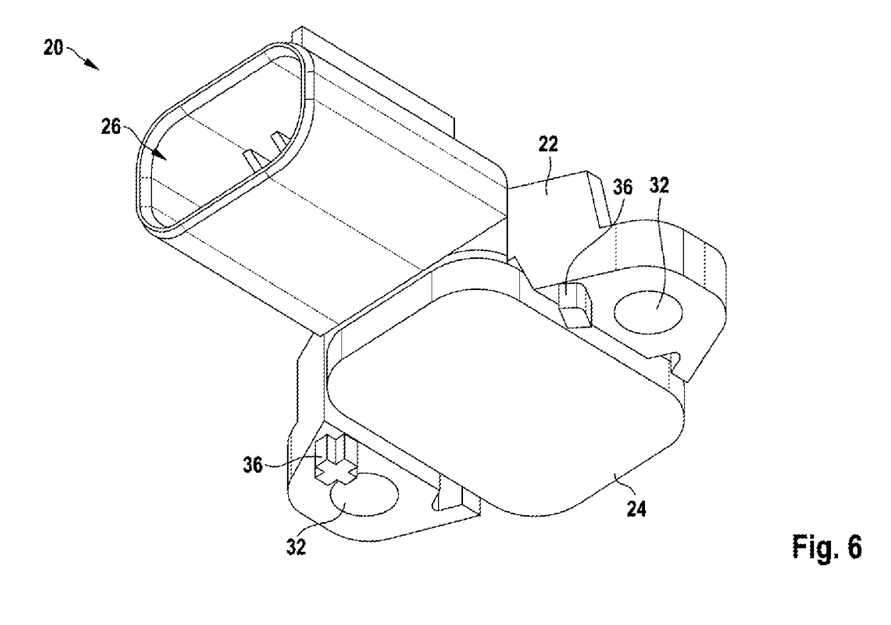
FIG. 6 shows a further schematic perspective illustration of the assembled sensor unit for the position encoder according to the disclosure from FIGS. 1 and 2.
Figure 7:
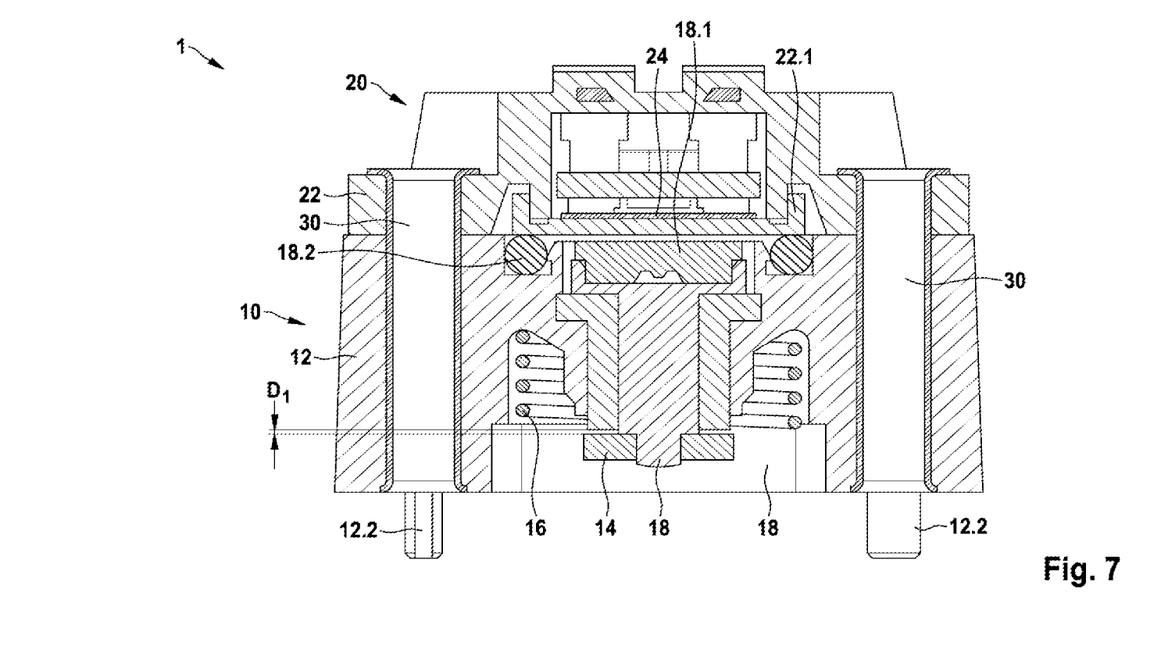
FIG. 7 shows a schematic cross-sectional illustration of the assembled position encoder according to the disclosure from FIGS. 1 and 2.
Figure 8:
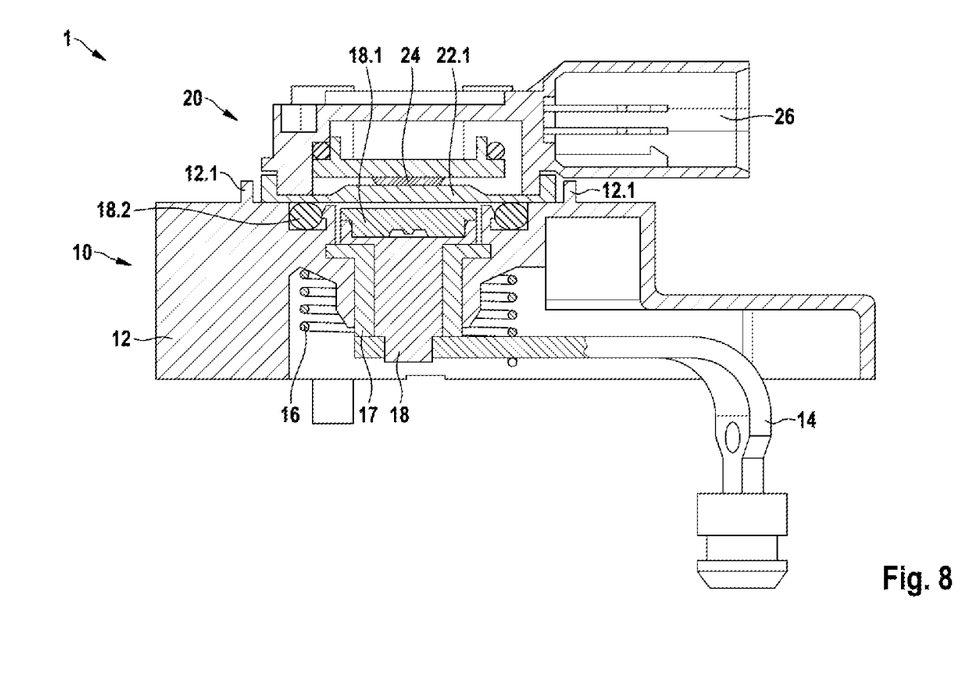
FIG. 8 shows a schematic longitudinal-sectional illustration of the position encoder according to the disclosure from FIGS. 1 and 2.

As is also apparent from FIG. 4 in particular, the housing 12 of the position encoder unit 10 also virtually completely accommodates the driver 14, as a result of which the driver 14 is also protected against undesired external influences. The driver 14 is connected to a shaft 18 which is mounted in a hollow axle 17 of the position encoder unit 10 and is driven by the driver 14. In this context, the shaft 18 carries out a rotational motion as a result of the motion of the driver 14. The signal encoder 18.1 is embodied as a permanent magnet in the illustrated exemplary embodiment, and is securely connected to the shaft 18, with the result that the signal encoder 18.1 moves with the shaft 18. The rotational motion of the shaft 18 changes the magnetic field of the permanent magnet 18.1, which is sensed by the sensor unit 20, for example via at least one sensor 24 which is embodied as a Hall element. The spray protection means 12.1 described above advantageously prevents coarse soiling entering the interior of the position encoder unit 10 and/or between the position encoder unit 10 and the sensor unit 20 and thereby inhibiting the mobility of the shaft 18 with the signal encoder 18.1 and/or blocking up the position encoder unit 20 and/or falsifying the position encoder signal. The sensor 24 which is fixed with respect to the signal encoder 18.1 registers the change in the magnetic field of the signal encoder 18.1. In the illustrated exemplary embodiment, the sensor 24 which is embodied as a Hall element is separated from the signal encoder 18.1 of the position encoder unit 10 by means of an air gap and the housing floor 22.1. The sensor 24 which is embodied as a Hall element translates a position of the lever and/or of the driver 14 into an actuation signal. Embodiments of the present disclosure make available a sensor unit 20 with a plug receptacle 26 via which an electrical connection to a control unit can be brought made, which control unit receives and evaluates the generated actuation signal.

As is also apparent from FIGS. 1 to 8, the position encoder unit 10 has a spring element 16 which is wound around the hollow axle 17 of the position encoder unit 10. The spring element 16, which is embodied as a leg spring, serves primarily for returning the driver 14, but is at the same time also designed as a compression spring. As a result, the permanent magnet 18.1 which is bonded into the shaft 14 is always pressed to one side. As a result, the spring element 16 reduces the necessary axial play D1 between the shaft 18 and a corresponding bearing, which is embodied, by way of example, as a flanged bearing, and prevents the shaft from generating rattling noises in the flanged bearing despite the necessary axial play D1. In addition, the distance between the permanent magnet and the sensor 24 which is embodied as a Hall element is always kept to the same value, and therefore the measuring accuracy is increased. The spring element 16 is mounted in such a way that the prestressing force of the spring element 16 moves the driver 14 into a predefined home position when the lever to be sensed is in an unactivated state.

Embodiments of the position encoder according to the disclosure can be used, for example, in a pedal unit (not illustrated) with a pedal lever and a pedal block for sensing the pedal travel of the pedal lever. As is apparent from FIGS. 2 and 4 in particular, the housing 12 of the position encoder unit has pins 12.2 for positioning or pre-locating the common physical unit on the pedal block (not illustrated) of the pedal unit.

The invention claimed is:

1. A position encoder, comprising:
a sensor unit; and
a position encoder unit configured to follow a motion of a lever via a driver so as to enable the sensor unit to sense the motion,
wherein the position encoder unit and the sensor unit have separate housings connected to one another, and
wherein the connection between the housings of the position encoder unit and the sensor unit includes at least one hollow riveted connection that forms a cavity into which at least one attachment element is configured to be guided, the at least one hollow riveted connection configured as a tubular rivet.

2. The position encoder as claimed in claim 1, wherein one or more of the housing of the position encoder unit and the housing of the sensor unit has a spray protection mechanism at the connection region.

3. The position encoder as claimed in claim 2, wherein the spray protection mechanism is configured as one or more of a raised portion, an oblique portion, an edge, and a collar.

4. The position encoder as claimed in claim 1, wherein the housing of the position encoder unit accommodates the driver.

5. The position encoder as claimed in claim 1, wherein the driver is connected to a shaft and is configured to drive the shaft, wherein the shaft is mounted in a hollow axle of the position encoder unit and comprises a signal encoder operatively connected to the shaft, wherein the signal encoder generates a physical variable which changes with the motion of the shaft, and wherein the sensor unit senses and evaluates the changeable physical variable.

6. The position encoder as claimed in claim 1, wherein a spring element is mounted about the hollow axle of the position encoder unit, the spring element being configured to regulate one or more of the distance between the driver and the shaft and the distance between the signal encoder and the sensor unit.

7. The position encoder as claimed in claim 6, wherein the spring element is mounted in such a way that the prestressing force of the spring element moves the driver into a predefined home position.

8. A pedal unit, comprising:
a pedal lever; and
a position encoder configured to sense a travel of the pedal lever, the position encoder including:
a sensor unit; and
a position encoder unit configured to follow the travel of the pedal lever via a driver so as to enable the sensor unit to sense the travel,
wherein the position encoder unit and the sensor unit have separate housings connected to one another, and
wherein the connection between the housings of the position encoder unit and the sensor unit includes at least one hollow riveted connection that forms a cavity into which at least one attachment element is configured to be guided, the at least one hollow riveted connection configured as a tubular rivet.

9. A position encoder, comprising:
a sensor unit; and
a position encoder unit configured to follow a motion of a lever via a driver so as to enable the sensor unit to sense the motion,
wherein the position encoder unit and the sensor unit have separate housings connected to one another,
wherein the connection between the housings of the position encoder unit and the sensor unit includes at least one hollow riveted connection that forms a cavity into which at least one attachment element is configured to be guided, and
wherein the driver is connected to a shaft and is configured to drive the shaft, wherein the shaft is mounted in a hollow axle of the position encoder unit and comprises a signal encoder operatively connected to the shaft, wherein the signal encoder generates a physical variable which changes with the motion of the shaft, and wherein the sensor unit senses and evaluates the changeable physical variable.

10. The position encoder as claimed in claim 9, wherein one or more of the housing of the position encoder unit and the housing of the sensor unit has a spray protection mechanism at the connection region.

11. The position encoder as claimed in claim 10, wherein the spray protection mechanism is configured as one or more of a raised portion, an oblique portion, an edge, and a collar.

12. The position encoder as claimed in claim 9, wherein the housing of the position encoder unit accommodates the driver.

13. The position encoder as claimed in claim 9, wherein a spring element is mounted about the hollow axle of the position encoder unit, the spring element being configured to regulate one or more of the distance between the driver and the shaft and the distance between the signal encoder and the sensor unit.

14. The position encoder as claimed in claim 13, wherein the spring element is mounted in such a way that the prestressing force of the spring element moves the driver into a predefined home position.

15. A position encoder, comprising:
a sensor unit; and
a position encoder unit configured to follow a motion of a lever via a driver so as to enable the sensor unit to sense the motion,
wherein the position encoder unit and the sensor unit have separate housings connected to one another,
wherein the connection between the housings of the position encoder unit and the sensor unit includes at least one hollow riveted connection that forms a cavity into which at least one attachment element is configured to be guided, and
wherein a spring element is mounted about the hollow axle of the position encoder unit, the spring element being configured to regulate one or more of the distance between the driver and the shaft and the distance between the signal encoder and the sensor unit.

16. The position encoder as claimed in claim 15, wherein one or more of the housing of the position encoder unit and the housing of the sensor unit has a spray protection mechanism at the connection region.

17. The position encoder as claimed in claim 15, wherein the spray protection mechanism is configured as one or more of a raised portion, an oblique portion, an edge, and a collar.

18. The position encoder as claimed in claim 15, wherein the housing of the position encoder unit accommodates the driver.

19. The position encoder as claimed in claim 15, wherein the spring element is mounted in such a way that the prestressing force of the spring element moves the driver into a predefined home position.

* * * * *